United States Patent
Indurkar

(10) Patent No.: US 9,603,009 B1
(45) Date of Patent: Mar. 21, 2017

(54) SYSTEM AND METHOD OF BRANDING A DEVICE INDEPENDENT OF DEVICE ACTIVATION

(71) Applicant: Sprint Communications Company L.P., Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 164 days.

(21) Appl. No.: 14/163,035

(22) Filed: Jan. 24, 2014

(51) Int. Cl.
*H04W 8/00* (2009.01)
*H04W 8/24* (2009.01)

(52) U.S. Cl.
CPC .................... *H04W 8/245* (2013.01)

(58) Field of Classification Search
None
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |
| 8,185,101 B1 | 5/2012 | Wiseman et al. | |
| 8,249,654 B1 | 8/2012 | Zhu | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |

(Continued)

FOREIGN PATENT DOCUMENTS

| EP | 2079256 A1 | 7/2009 |
|---|---|---|
| EP | 2461613 A1 | 6/2012 |

(Continued)

OTHER PUBLICATIONS

FAIPP Pre-Interview Communication dated Jun. 2, 2015, U.S. Appl. No. 14/152,627, filed Jan. 10, 2013.

(Continued)

*Primary Examiner* — Ashish K Thomas

(57) ABSTRACT

A mobile device branded with a cellular service brand is disclosed. The system comprises a processor and a memory comprising user data and brand configuration data, wherein the brand configuration data brands the mobile device with the cellular service brand without activating cellular service. The system further comprises an activation application stored in the memory that, when executed by the processor activates cellular service on the mobile device with a network of the cellular service brand without deleting at least the user data.

17 Claims, 7 Drawing Sheets

(56) References Cited

U.S. PATENT DOCUMENTS

| | | |
|---|---|---|
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1* | 12/2015 | Annan .................. H04W 4/00 |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 9,313,643 B1 | 4/2016 | Ghoshal et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 2002/0091931 A1 | 7/2002 | Quick, Jr. et al. |
| 2002/0142783 A1 | 10/2002 | Yoldi et al. |
| 2003/0023514 A1* | 1/2003 | Adler .................. G06Q 30/02 705/80 |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1 | 5/2005 | Rudolph |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1 | 9/2005 | Chang |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1* | 6/2006 | Jothipragasam .. H04M 3/42289 455/419 |
| 2006/0154651 A1 | 7/2006 | Knowles |
| 2006/0203722 A1 | 9/2006 | Oommen |
| 2006/0208071 A1* | 9/2006 | Chang .................. G06Q 30/02 235/383 |
| 2006/0235944 A1 | 10/2006 | Haslam |
| 2006/0236325 A1 | 10/2006 | Rao et al. |
| 2006/0246949 A1* | 11/2006 | Gupta .................... H04W 4/24 455/558 |
| 2007/0004404 A1 | 1/2007 | Buckley et al. |
| 2007/0015538 A1 | 1/2007 | Wang |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1* | 3/2008 | Altbaum ............... H04W 8/245 455/435.1 |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 A1 | 8/2008 | Choi et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1* | 3/2009 | Fleischman ......... H04L 41/0809 455/419 |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0190479 A1 | 7/2010 | Scott et al. |
| 2010/0192120 A1* | 7/2010 | Raleigh ............ G06Q 10/06375 717/101 |
| 2010/0194632 A1 | 8/2010 | Raento et al. |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1* | 9/2010 | Vanderlinden ........ H04W 8/245 455/418 |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |

(56) References Cited

U.S. PATENT DOCUMENTS

| | | |
|---|---|---|
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1* | 3/2011 | Oktay ............... H04L 65/1046 370/352 |
| 2011/0081885 A1 | 4/2011 | Sennett et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0142327 A1* | 6/2012 | Urbanek ............... H04W 4/001 455/418 |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1 | 12/2012 | De Atley et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0031541 A1 | 1/2013 | Wilks et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | Mcpherson et al. |
| 2013/0111461 A1 | 5/2013 | Zubas et al. |
| 2013/0124186 A1 | 5/2013 | Donabedian et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0281085 A1 | 10/2013 | Sen et al. |
| 2013/0295902 A1 | 11/2013 | Justen et al. |
| 2013/0303142 A1 | 11/2013 | Burcham et al. |
| 2013/0310003 A1 | 11/2013 | Sadhvani Rita et al. |
| 2013/0311836 A1 | 11/2013 | Hurst Cameron et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1* | 3/2014 | Urbanek ............... H04W 8/20 455/418 |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |
| 2016/0094931 A1 | 3/2016 | Urbanek |
| 2016/0234675 A1 | 8/2016 | Ghoshal et al. |

FOREIGN PATENT DOCUMENTS

| | | |
|---|---|---|
| GB | 2292047 A | 2/1996 |
| JP | 5924347 B2 | 4/2015 |
| KR | 2006039974 A | 5/2006 |
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |
| WO | WO2016130266 A1 | 8/2016 |

OTHER PUBLICATIONS

Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.

(56) References Cited

OTHER PUBLICATIONS

Notice of Allowance dated Jul. 15, 2015, U.S. Appl. No. 13/622,234, filed on Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, Motorola FONE F3 Review, www.mobilegazette.com, Sep. 16, 2007.

(56) References Cited

OTHER PUBLICATIONS

Delker, Jason R., et al. "Network Access Tiered Based on Application Launcher Installation," filed May 25, 2016, U.S. Appl. No. 15/164,530.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Notice of Allowance dated Aug. 18, 2016, U.S. Appl. No. 13/968,259, filed Aug. 15, 2013.
Office Action dated Oct. 6, 2016, U.S. Appl. No. 14/231,718, filed Mar. 31, 2014.
Yota Devices, "Hands-on with the YotaPhone: the e-ink Android phone that nobody expected," New York Times, 2010.
Ghoshal, Jagannath, et al., "System and Method of Mobile Phone Customization Based on Universal Manifest with Feature Override," filed Sep. 16, 2016, U.S. Appl. No. 15/268,347.
Ghoshal, Jagannath, et al., "System and Method of Mobile Phone Customization Based on Universal Manifest," filed Sep. 14, 2016, U.S. Appl. No. 15/265,833.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861 filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed Aug. 15, 2013.
Foreign Communication From a Related Counterpart Application, International Search Report and Written Opinion dated Jan. 24, 2014, International Application No. PCT/US13/68981, filed on Nov. 7, 2013.

(56) References Cited

OTHER PUBLICATIONS

Foreign Communication from a Related Counterpart—International Search Report and Written Opinion, dated May 19, 2014, PCT/US14/13936, filed on Jan. 30, 2014.

Foreign Communication from a Related Counterpart—International Search Report and Written Opinion, dated May 14, 2014, PCT/US14/13939, filed on Jan. 30, 2014.

Delker, Jason R., "Loading Branded Media Outside System Partition", filed Oct. 30, 2013, U.S. Appl. No. 14/066,947.

Mauer, Brian D., et al., "Automatic Branding of Generic Applications", filed Jan. 10, 2013, U.S. Appl. No. 14/152,627.

Spanel, Robert L., et al., Patent Application entitled "Dynamic Remotely Managed SIM Profile" U.S. Appl. No. 13/744,847, filed Jan. 18, 2013.

Annan, Brandon C., et al.,"System and Method of Branding and Labeling a Mobile Device", filed Mar. 15, 2013, U.S. Appl. No. 13/844,104.

Annan, Brandon C., et al.,"Electronic Fixed Brand Labeling", filed Feb. 8, 2013, U.S. Appl. No. 13/763,443.

Ghoshal, Jagannath, et al.,"Rebranding a Portable Electronic Device While Maintaining User Data", filed May 22, 2013, U.S. Appl. No. 13/899,567.

Ghoshal, Jagannath, et al.,"System and Method for Retrofitting a Branding Framework into a Mobile Communication Device", filed May 21, 2013, U.S. Appl. No. 13/899,566.

Urbanek, Robert E., "Delivery of Branding Content and Customizations to a Mobile Communication Device", filed Oct. 23, 2013, U.S. Appl. No. 14/060,712.

Urbanek, Robert E., "Implementation of Remotely Hosted Branding Content and Customizations", filed Oct. 23, 2013, U.S. Appl. No. 14/085,474.

Urbanek, Robert E., "Subscriber Identity Module Virtualization", filed Nov. 20, 2013, U.S. Appl. No. 14/060,719.

Sumner, Bret D., "Directing Server Connection Based on Location Identifier", filed Aug. 15, 2013, U.S. Appl. No. 13/968,259.

Abou-El-Ella, Hassan, et al., "Segmented Customization Payload Delivery", filed Aug. 27, 2013, U.S. Appl. No. 14/010,518.

Sumner, Bret D., "Segmented Customization Package Within Distributed Server Architecture", filed Aug. 27, 2013, U.S. Appl. No. 14/010,522.

Masterson, Michelle E., et al., "Development and Testing of Payload Receipt by a Portable Electronic Device", filed Aug. 27, 2013, U.S. Appl. No. 14/010,523.

Masterson, Michelle E., et al., "System and Methods for Deferred and Remote Device Branding", filed Aug. 27, 2013, U.S. Appl. No. 14/010,524.

Masterson, Michelle E., et al., "System and Methods for Deferred and Remote Device Branding", filed Jul. 16, 2014, International Serial No. PCT/US14/46773.

Callan, Jeffery S., et al., "Delivery of Oversized Branding Elements for Customization", filed Nov. 6, 2013, U.S. Appl. No. 14/073,321.

Indurkar, Dhananjay, "Background Delivery of Device Configuration and Branding", filed Jan. 16, 2014, U.S. Appl. No. 14/157,507.

Ahn, Chul Jin, et al., "Separation of Client Identification Composition from Customization Payload to Original Equipment Manufacturer Layer", filed Nov. 8, 2013, U.S. Appl. No. 14/075,687.

Ghoshal, Jagannath, et al., "Multiple Carrier Partition Dynamic Access on a Mobile Device", filed Jun. 5, 2014, U.S. Appl. No. 14/297,429.

Indurkar, Dhananjay, "Activation Sequence Using Permission Based Connection to Network", filed Jan. 24, 2014, U.S. Appl. No. 14/163,041.

Ahn, Chul Jin, et al., "Customization for Preloaded Applications", filed Mar. 31, 2014, U.S. Appl. No. 14/231,718.

First Action Interview Pre-Interview Communication dated Sep. 22, 2014, U.S. Appl. No. 13/468,028, filed May 9, 2013.

Foreign Communication from a Related Counterpart—International Search Report and Written Opinion, dated Jun. 3, 2014,PCT/US14/16650, filed Feb. 16, 2014.

Urbanek, Robert E., "Delivery of Branding Content and Customizations to a Mobile Communication Device", filed , 201, International Serial No. PCT/US14/56778.

EP Search Report dated Oct. 12, 2016, EP International Application No. 11847301.6, filed on Jun. 20, 2013.

Final Office Action dated Oct. 26, 2016, U.S. Appl. No. 13/468,028, filed May 9, 2012.

Office Action dated Dec. 29, 2016, U.S. Appl. No. 14/060,712, filed Oct. 23, 2013.

FAIPP Pre-Interview Communication dated Nov. 4, 2016, U.S. Appl. No. 14/530,666, filed Oct. 31, 2014.

* cited by examiner

SYSTEM AND METHOD OF BRANDING A DEVICE INDEPENDENT OF DEVICE ACTIVATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may obtain network connectivity through base stations with one or more service networks. Mobile devices may be branded with particular cellular service brands associated with cellular service providers.

SUMMARY

In an embodiment, a mobile device branded with a cellular service brand is disclosed. The system comprises a processor and a memory comprising user data and brand configuration data, wherein the brand configuration data brands the mobile device with the cellular service brand without activating cellular service. The system further comprises an activation application stored in the memory that, when executed by the processor activates cellular service on the branded mobile device with a network of the cellular service brand by receiving at least one network access identification code and a mobile device number without deleting at least the user data.

In an embodiment, a method of activating cellular service on a mobile device is disclosed. The method comprises storing, by the mobile device, user data and brand configuration data, wherein the brand configuration data brands the mobile device with a cellular service brand. The method also comprises activating, by the mobile device, cellular service with a network of the cellular service brand without deleting the stored user data, wherein activating cellular service comprises receiving at least one network access identification code and a mobile device number.

In an embodiment, a method of activating cellular service on a mobile device is disclosed. The method comprises storing, by the mobile device, an initial set of brand configuration data, wherein the initial set of brand configuration data brands the mobile device with an initial cellular service brand. The method further comprises installing, by the mobile device, a branding application associated with a different cellular service brand, wherein the branding application comprises a different set of brand configuration data associated with the different cellular service brand, and wherein installing the branding application rebrands the mobile device from the initial cellular service brand to the different cellular service brand. The method further comprises storing, by the mobile device, user data. The method also comprises activating, by the mobile device, cellular service with a different network of the different cellular service brand without deleting the stored user data, wherein activating the cellular service comprises receiving at least one network access identification code and a mobile device number.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
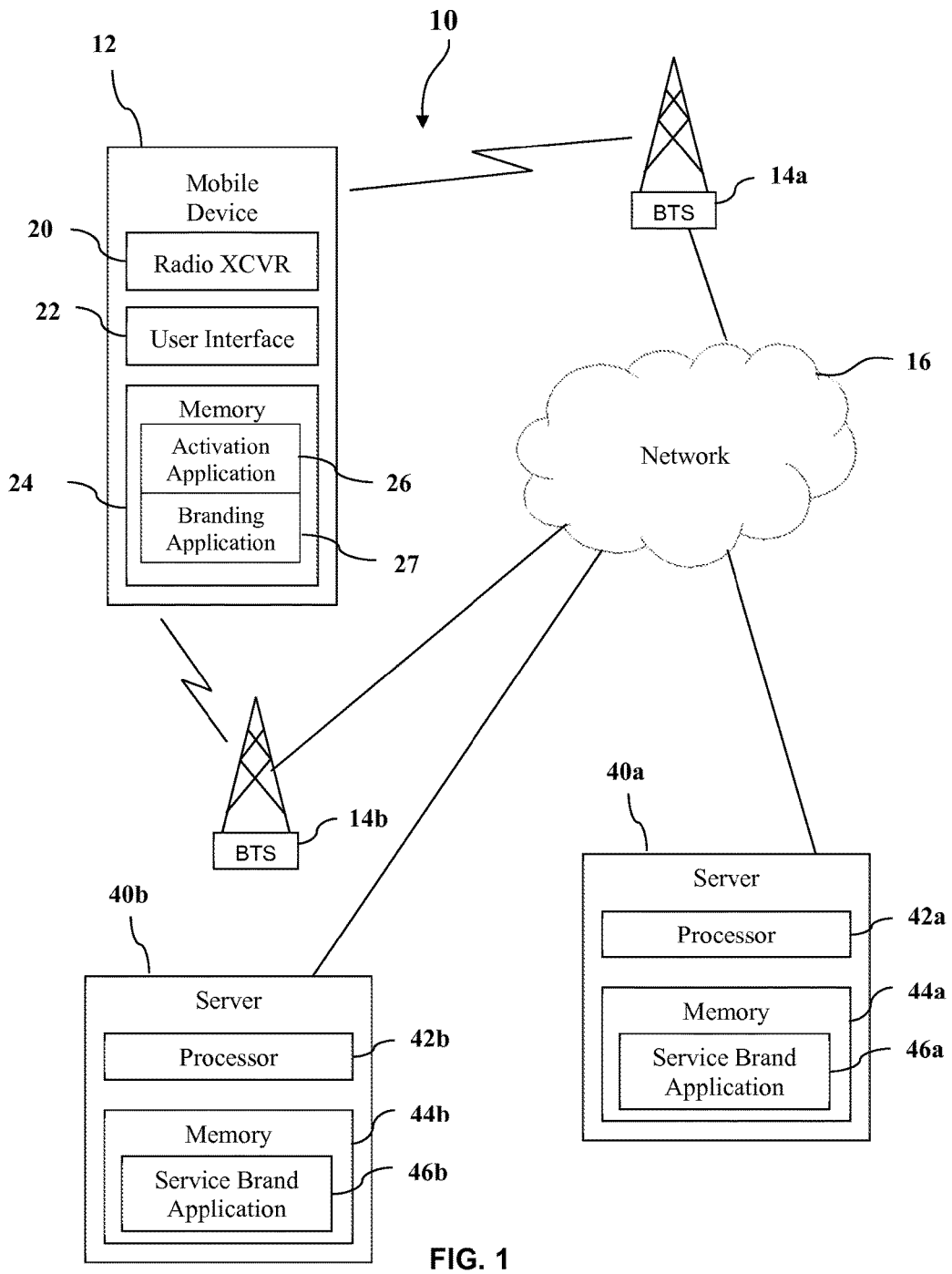
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The system disclosed herein provides a mobile device owner with the opportunity to selectively activate cellular wireless communication service on a mobile device at a time separate from the time when a mobile device is branded with a particular cellular service brand without deleting user data (e.g. music, pictures, applications, and/or the like) stored on the mobile device before cellular service is activated. Brand configuration data associated with a particular cellular service brand may be stored and/or installed on the mobile device, for example, before a mobile device is purchased by a mobile device owner. After the brand configuration data is stored and/or installed on the mobile device, a mobile device reset is executed branding the mobile device with the brand associated with the brand configuration data. Generally, when a mobile device reset is executed any user data stored in the memory of the mobile device may be deleted.

A mobile device owner may have purchased the branded mobile device and initiated a mobile device reset, but may have decided to abstain from activating cellular service on the mobile device to avoid the expense of a subscription for cellular wireless communication service, possibly when the mobile device has a WiFi radio transceiver and the user doesn't need the cellular communication service because a WiFi access point is available to connect the device to the Internet. Because the mobile device has been branded but not activated with cellular service, the mobile device may be lacking at least one network access identification code and a mobile device number (e.g., a mobile phone number). The mobile device owner may download user data on the mobile device, and subsequently the mobile device owner may decide to activate cellular service for example so that the mobile device owner's children can be entertained on a long road trip away from a WLAN connection. The mobile device owner may then activate cellular service on the mobile device by requesting and receiving at least one network access identification code and a mobile device number for the road trip. To complete activation of the cellular service, a modem reset of the device may be performed without performing a full device reset. It is understood by those skilled in the art that a modem reset affects only the cellular radio transceiver and not the main central processor of the device, and hence the user data stored in memory of the device is not lost during such a modem reset. Said in other words, by performing branding of the device before performing service provisioning (e.g., activating cellular wireless communication service), the former need to perform a reset of the mobile device can be avoided and hence user installed data can be preserved during one or more service provisioning events, since service provisioning only entails a modem reset to be effective and does not require a system reset to be effective.

Because the mobile device may be used before service activation of cellular communication services, for example by using a short-range radio transceiver of the device linked to a wireless access point, for example linked to a WiFi access point, performing branding before service activation can provide all the usual benefits of branding even when the device is not able to engage in cellular wireless communication. For example, the user of the mobile device may be exposed to the attractive graphics logo of the cellular service provider even when the device is not yet activated for cellular communication. The user of the mobile device may grow accustomed to wallpaper and applications supported by the cellular communication service provider even when the device is not yet activated for cellular communication. The user of the mobile device may browse internet sites and be provided ad experiences via the brand and the cellular communication service provider may be able to obtain ad revenue even when the device is not yet activated for cellular communication. When it is considered that the device may be used in this fashion for six months or more before activation of a cellular communication service, it can readily be appreciated the extra value to the cellular communication service provider to have their brand active on the mobile device during this time interval.

In an embodiment, after cellular service is activated on the mobile device, cellular service may be subsequently deactivated for the device by deleting the at least one network access identification code and a mobile device number from the device. If cellular service is later again desired, cellular service may be reactivated by again requesting and receiving at least one network access identification code and a mobile device number without deleting user data stored on the mobile device. Furthermore, even when cellular service is not activated on a mobile device, one or more applications in communication with a network may communicate with the mobile device through a limited cellular service.

In an embodiment, the system provides a mobile device owner the opportunity to change a mobile device branded from an initial brand to a different brand. The mobile device owner may download a branding application associated with a different brand when the mobile device owner's mobile device is branded with an initial brand. The branding application may delete the initial brand configuration data and replace it with the different brand configuration data. The mobile device may store and/or install the different branding application and execute a mobile device reset. The branding application may also comprise an activation application. Thus, after rebranding the mobile device, the mobile device owner may store and/or install user data on the mobile device. Subsequently, the mobile device owner may initiate the activation application of the branding application to activate cellular service on the mobile device without deleting the user data stored on the mobile device by the mobile device owner.

Turning now to FIG. 1, a communication system 10 is described. The system 10 may comprise one or more mobile devices 12, base transceiver stations (BTS) 14a and 14b, a network 16, and one or more servers 40a and/or 40b. In an embodiment, the servers 40a and/or 40b may be configured to store one or more service brand applications 46a and/or 46b which function to provide brand configuration data and/or enable a mobile device 12 to receive cellular service with the network 16 of a brand. For example, the server 40a may store a first service brand application 46a which provides brand configuration data associated with a first brand which may be installed on a mobile device 12 in order to brand the mobile device 12 with the first brand. The server 40a may also enable a mobile device 12 to receive cellular service from a network and/or from a wireless communication service provider associated with the first brand for example, when the mobile device 12 transmits an activation signal to the server 40a. While applications 46a and 46b are illustrated in FIG. 1, it is understood that the communication system 10 may comprise a plurality of applications 46 stored in the memory 44a of the server 40a and/or the memory 44b of the server 40b. In an embodiment, the service brand applications 46a and/or 46b may be configured to provide branding applications which may be installed on the mobile device 12 and to enable the branding and/or rebranding of mobile device(s) 12, which will be disclosed in more detail herein.

The mobile device 12 may be a mobile phone, a personal digital assistant (PDA), a media player, or other communication enabled portable electronic device. In an embodiment, the mobile device 12 may be implemented as a handset. Details of handsets are discussed further hereinafter. The base transceiver stations 14a and 14b provide a communication link to the mobile device(s) 12 and couple the mobile device 12 to the network 16. In an embodiment, the base transceiver stations 14a and 14b provide wireless communication links to the mobile device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14a and 14b are illustrated in FIG. 1, it is understood that the communication system 10 may comprise two or more base transceiver stations 14 and any number of mobile devices 12. The network 16 may be a public communication network, a private communication network, or a combination thereof.

The mobile device 12 may comprise a radio transceiver 20, a user interface 22, and a memory 24. Alternatively, the mobile device 12 may comprise two or more radio transceivers 20. In an embodiment, the mobile device 12 may store brand configuration data in the memory 24. Brand configuration data may comprise data that brands a mobile device 12 with a particular cellular service brand of a cellular service provider so that when cellular service is activated, the mobile device 12 will receive cellular service through the particular brand associated with the brand configuration data. In an embodiment, the cellular service brands may be associated with same cellular service providers. For example, the Boost Mobile brand and Sprint brand may both be associated with the same cellular service provider, Sprint. In an embodiment, the cellular service brands may be associated with different cellular service providers. For example, the AT&T brand is associated with the AT&T cellular service provider, while the Verizon brand is associated with the Verizon cellular service provider.

In an embodiment, the brand configuration data may comprise data used to activate cellular service on a mobile device 12 except at least one network identification code and a mobile device number (e.g. a telephone number). For example, during manufacturing of a mobile device 12 brand configuration data associated with a particular brand may have been installed on the mobile device 12. The brand configuration data may comprise data used to activate cellular service on the mobile device 12 except a network identification code a mobile device number. Upon powering on the mobile device 12, the brand configuration data may configure the mobile device with the particular brand and execute a mobile device reset deleting any stored data (e.g. user data, data other than the brand configuration data, and/or other data used for the basic mobile device 12 operation) stored on the mobile device 12 as if the mobile device 12 were about to receive cellular service through the brand associated with the brand configuration data. However, because the brand configuration data may not comprise at least one network identification code and a mobile device number, the mobile device 12 may not receive cellular service after the mobile device reset even though the mobile device 12 is branded with the particular cellular service brand.

In an embodiment, the mobile device 12 may not have been manufactured with brand configuration data stored in the memory 24. Brand configuration data may be transmitted and/or received from one or more service brand applications 46a and/or 46b in response to the mobile device 12 being powered on and/or manually transmitting an identification signal. The identification signal may comprise a unique mobile device identifier.

Unique mobile device identifiers may be expressed in a variety of formats. For example, mobile device 12 may be manufactured to use the code division multiple access (CDMA) technology and receive a unique identifier called a mobile equipment identifier (MEID). The unique identifier for mobile device 12 manufactured with the global system for mobile communications (GSM), a stock keeping unit (SKU), or universal mobile telecommunications system (UMTS) technologies is called an international mobile subscriber identity (IMSI). A mobile device 12 manufactured using the integrated digital enhanced network (iDEN) technology receives a unique identifier called an international mobile equipment identity (IMEI).

The one or more service brand applications 46a and/or 46b may identify the unique mobile device identifier and transmit a particular set of brand configuration data based on the unique mobile device identifier. Once the mobile device 12 receives the brand configuration data, the brand configuration data may be installed, thereby branding the mobile device 12 with the particular brand associated with the brand configuration data. In an embodiment, the brand configuration data may be transmitted to the mobile device 12 through wireless communication, comprising at least one of long-term evolution wireless communication, evolution-data optimized wireless communication, single carrier radio transmission technology (1×RTT), or a wireless local area network (WLAN). In an embodiment, the brand configuration data may be transmitted to a mobile device 12 through a wired data communication, USB drive, and/or the like. In an embodiment, the mobile device 12 may select from the wireless technologies or wireless data protocols in a prioritized order that it uses to receive/download the brand configuration data. Thus, if the first priority wireless service is available it is used to download the brand configuration data; if the first priority wireless service is not available, the second priority wireless service is used to download; if neither the first priority or second priority wireless service are available, the third priority wireless service is used to download; etc. In an embodiment, downloading via long-term evolution wireless communication is the first priority wireless data service; evolution-data optimized wireless communication is the second priority wireless data service; 1×RTT is the third priority wireless data service; and WLAN wireless data service (e.g., WiFi) is the fourth priority data service.

It should be noted that a unique identifier is a unique string of characters assigned to manufactured mobile device(s) 12. Because mobile device 12 may use different technologies, unique identifiers may be expressed in a variety of formats. For example, mobile device 12 may be manufactured to use the code division multiple access (CDMA) technology and receive a unique identifier called a mobile equipment identifier (MEID). The unique identifier for mobile device 12 manufactured with the global system for mobile communications (GSM), a stock keeping unit (SKU), or universal mobile telecommunications system (UMTS) technologies is called an international mobile subscriber identity (IMSI). A mobile device 12 manufactured using the integrated digital enhanced network (iDEN) technology receive a unique identifier called an international mobile equipment identity (IMEI). In the cases described using these technologies, the unique identifiers are associated with the hardware of the mobile device 12 and the unique identifiers do not normally change. In an embodiment, some mobile devices 12 are assigned unique identifiers by the wireless service providers selling the mobile device 12 and for purposes of the discussion of the present disclosure these assigned unique identifiers are recognized and used by the components of the system 10. Unique identifiers are typically provided in origination messages to establish voice and/or data calls and/or sessions.

A mobile device owner may purchase the branded mobile device 12 and decide that he/she wants to use the mobile device 12 for purposes that do not require cellular wireless communication service. Thus, the mobile device owner may use the mobile device 12 without having to pay for cellular wireless communication service, but may still have the option to activate cellular service at later date if the mobile device owner wishes to activate it. Furthermore, because the brand configuration data has already configured the mobile device 12 with a particular brand and because the brand configuration data has already executed a mobile device reset (which deletes any user data stored in the memory 24 of the mobile device 12), any user data stored by the mobile device owner before activating cellular service will not be lost when cellular service is activated because the mobile device reset associated with installing the branding customization was previously executed and thus not needed to activate cellular service. To activate the cellular service the mobile device 12 may only execute a modem reset, and a modem reset does not cause user data to be erased or lost. For example, a modem reset may reset the radio transceiver 20 of the mobile device 12. Thus, a mobile device user may purchase a mobile device branded with a cellular service brand, install user data such as one or more movies, one or more songs, one or more pictures, one or more applications, and/or the like on the mobile device 12, and subsequently activate cellular service without deleting the installed user data already stored on the mobile device 12. As will be discussed further herein, the mobile device 12 may comprise an activation application 26 configured to activate cellular service on a mobile device without resetting the mobile device 12 and thus without deleting user data stored on the mobile device 12. In an embodiment, cellular wireless communication service may be activated on the mobile device 12 with a radio modem reset that does not entail a full reset to factory defaults of the mobile device 12 and hence no loss of user data.

In an embodiment, the mobile device 12 may comprise the activation application 26. The activation application 26 may be configured to activate cellular service with the network 16 associated with a cellular service brand. The activation application 26 may be configured to communicate with one or more service brand applications 46a and/or 46b on the servers 40a and/or 40b, respectively. The server 40a and/or 40b may comprise processors 42a and/or 42b, memories 44a and/or 44b, and the service brand applications 46a and 46b stored in the memories 44a and/or 44b, respectively. The servers 40a and/or 40b may also comprise a plurality of processors located in a plurality of computers. Computers are discussed in more detail hereinafter.

The service brand applications 46a and 46b, when executed by the processor 42a and/or 42b of the server 40a and/or 40b, may be configured to enable activation of cellular wireless communication service on the mobile device 12 with the network 16 associated with a particular cellular service brand in response to receiving a communication from the activation application 26. For example, brand configuration data of a cellular service brand may have been installed on the mobile device 12 when the mobile device 12 was manufactured and/or sold at a retail store. The mobile device 12 may have been purchased by a mobile device owner who initially did not want and/or need mobile communication service with his/her mobile device 12. The mobile device owner may have decided to take his/her family on a vacation and wish to activate cellular service on his/her mobile device 12 in order to entertain his/her children on the long car ride. The activation application 26 installed on the mobile device 12 may be executed by the mobile device owner to communicate with one or more service brand applications 46a and/or 46b to obtain cellular service.

In an embodiment, the activation application 26 may have previously been installed on the mobile device 12, for example, when the mobile device 12 was manufactured, purchased at a retail store, and/or when the brand configuration data was installed on the mobile device 12. In an embodiment, the activation application 26 may be installed on the mobile device 12 when the mobile device owner is ready to activate cellular service on his/her mobile device 12. For example, the mobile device 12 may be given access to limited cellular service allowing the mobile device owner to download the activation application 26 to the mobile device 12 through a cellular service network. The mobile device owner may download the activation application 26 to the mobile device 12 through a WLAN, a USB port, wired data connection, and/or the like. Once downloaded, the mobile device owner may execute the activation application 26 to communicate with the one or more service brand applications 46a and/or 46b to obtain cellular service.

In an embodiment, the activation application 26 may be executed on the mobile device 12 solely by initiating the activation application 26 and/or downloading the activation application 26. For example, the activation application 26 may have been previously installed in the mobile device 12 when the mobile device 12 was manufactured. The mobile device owner may not have wanted cellular service on the mobile device 12 when he/she initially purchased the mobile device 12, as the mobile device owner planned on using the mobile device 12 only within the confines of a WLAN connection. However, the mobile device owner may have decided to take his/her mobile device 12 to a location where a WLAN connection is not available. The mobile device owner may then select the activation application 26, for example, by tagging an icon associated with the activation application 26 in order to attain cellular service. Upon selecting the activation application 26, the activation application 26 may communicate with one or more service brand application 46a and/or 46b so that mobile device 12 may receive cellular service.

In an embodiment, the activation application 26 may have stored one or more unique mobile device identifications associated with the mobile device 12, account information of the mobile device owner (e.g. a bank account number and/or routing number to pay for cellular service), and/or any other information which may be needed or wanted to provide cellular service to the mobile device 12. Thus, when the mobile device owner decides to attain cellular service through his/her mobile device 12, cellular service may be activated on the mobile device 12 solely by initiating the activation application 26. For example, a mobile device owner may wish to establish cellular service through a cellular service network. The mobile device owner may open and/or select an activation application icon which initiates the activation application 26. In an embodiment, after the mobile device owner opens and/or selects the activation application icon, the mobile device owner may be provided with a menu comprising a selection which initiates the activation application 26 to activate cellular service on the mobile device 12. The activation application 26 may also comprise a cellular service deactivation feature which allows a mobile device owner to deactivate cellular service when the mobile device owner no longer wishes to receive cellular service.

In an embodiment, the activation application 26 may provide a selection window with one or more fields that a mobile device owner wishing to receive cellular service may fill in before obtaining cellular service through a mobile device 12. For example, a mobile device owner may open the activation application 26. Upon opening the activation application 26, a selection window may appear on the user interface 22 of the mobile device 12. The selection window may comprise one or more fields that the mobile device owner must fill in in order to receive cellular service. The one or more fields may comprise a cellular service account number, payment information, a user name and/or password, and mobile device owner's address, how long the mobile device owner wants cellular service, and/or the like. Upon entering this information and selecting an initiate command, the activation application 26 may communicate with one or more service brand applications 46*a* and/or 46*b* so that the mobile device 12 receives cellular service.

In an embodiment, communication from the activation application 26 on the mobile device 12 to the service brand application(s) 46*a* and/or 46*b* may comprise a message indicating that cellular service activation on a mobile device is requested. The request message may identify the particular mobile device, a unique password from a mobile device owner, payment information, a cellular service subscription term, one or more items of information provided by the brand configuration data, and/or the like. The brand configuration data may also provide information to the activation application 26 identifying the particular service brand applications 46*a* and/or 46*b* associated with the brand configuration data.

Once the service brand application(s) 46*a* and/or 46*b* receive the request message from the activation application 26, the service brand application(s) 46*a* and/or 46*b* may provide an authorization message back to the mobile device 12 and/or the activation application 26 authorizing the mobile device 12 to receive cellular service. The mobile device 12 may be provisioned with the cellular network 16. The authorization message may comprise at least one network access identification code and a mobile device number. The network access identification code may be used by the mobile device 12 to verify with the network 16 that the mobile device 12 is authorized to access the network 16. Thus, when the mobile device 12 transmits and/or receives data through the network 16, the mobile device 12 may provide the network access identification code validating that the mobile device 12 is authorized to send and/or receive data through the cellular service network 16. The mobile device number (e.g. a phone number) is a number assigned to the mobile device 12 so that the mobile device 12 may receive mobile telephone call, text messages, and/or the like. One of ordinary skill in the art would understand after reading this disclosure how a mobile device number may be used by the mobile device 12.

Once the activation application 26 and/or the mobile device 12 receives the authorization message from the service brand application(s) 46*a* and/or 46*b* comprising the at least one network access identification code and/or the mobile device number, the activation application 26 and/or the mobile device 12 may install the at least one network access identification code and/or the mobile device number with the mobile device 12 in order to complete configuration of the mobile device 12 and receive cellular service through the network 16 and/or the brand associated with the brand configuration data. By receiving and installing the at least one network identification access code and/or the mobile device number at a separate time from branding the mobile device 12 with brand configuration data, the mobile device 12 may be branded with a particular cellular service brand without a mobile device owner having to pay for and receive cellular service, for example, when the mobile device owner initially purchases the mobile device 12. Furthermore, because the brand configuration data has previously executed a mobile device reset, for example, before the mobile device owner installed any user data on the mobile device 12, when the mobile device owner wishes to activate cellular service on the mobile device 12, the mobile device may receive cellular service without deleting the user data stored on the mobile device 12 after the mobile device reset but before activating cellular service.

In an embodiment, the activation application 26 may be configured to deactivate cellular service on a mobile device 12 and trigger the deprovisioning of the mobile device 12 with the network 16. In an embodiment, deactivating may comprise deleting the at least one network access identification codes and/or the mobile device number without deleting the brand configuration data. For example, the mobile device owner may not have cellular service for a mobile device 12 because the mobile device owner uses his mobile device 12 primarily in the presence of a WLAN connection. The mobile device owner may plan a trip to a location where a WLAN connection is not present and where the mobile device owner wishes to use the mobile device 12 to receive and/or transmit data. The mobile device owner may use the activation application 26 to activate cellular service while on the trip to receive and/or transmit data. However, once the mobile device owner returns from the trip and back to the location of the WLAN, the mobile device owner may no longer wish to have cellular service. Thus, the mobile device owner may make a selection through a selection window provided by the activation application 26 on the user interface 22 of the mobile device 12 deactivating cellular service. By deactivating cellular service, the mobile device 12 may delete the at least one network access identification codes and/or the mobile device number without deleting the brand configuration data and any user data stored on the mobile device 12.

In an embodiment, the mobile device owner may have paid and/or specified a particular amount of time that cellular service was requested on the mobile device 12. The mobile device owner may have activated cellular service through the activation application 26. When the specified amount of time for receiving cellular service expires, the activation application 26 may automatically deactivate cellular service by deleting the at least one network access identification codes and/or the mobile device number. In an embodiment, service brand application 46*a* and/or 46*b* may transmit a message instructing the activation application 26 to deactivate cellular service and deprovision the mobile device 12 with the network 16 by deleting the at least one network access identification codes and/or the mobile device number without deleting the brand configuration data when the specified amount of time for receiving cellular service expires.

In an embodiment, the activation application 26 may be configured to reactivate cellular service on a mobile device 12 after deactivating cellular service from the mobile device 12 such that the user data stored on the mobile device 12, for example, after the brand configuration data is installed and/or a mobile device reset is executed, is not deleted on the mobile device 12. In an embodiment, reactivating may comprise receiving at least one network access identification codes and/or a mobile device number. In an embodiment, the at least one network access identification and/or a mobile device number received during reactivation may comprise a new and/or different at least one network access identification and/or a mobile device number. For example, the mobile device owner may wish to return to the location where no WLAN data connection is present, but also wish to transmit and/or receive data through their mobile device 12. The mobile device owner may reactivate cellular service on the mobile device 12 through the activation application 26. Upon activation, the activation application 26 may receive a new and/or different at least one network access identification and/or mobile device number from the first at least one network access identification and/or mobile device number received during a previous activation. Furthermore, the mobile device owner may have installed user data on the mobile device 12 between the time when the mobile device owner deactivated cellular service and reactivated cellular service. However, because the brand configuration data was previously installed on the mobile device 12 and/or a mobile device reset was executed on the mobile device 12 before the mobile device 12 was activated to receive cellular service, the user data installed on the mobile device 12 between the time when the mobile device owner deactivated cellular service and reactivated cellular service may not be deleted during reactivation.

In an embodiment, even when the cellular service is not activated on the mobile device 12, the mobile device 12 may receive limited cellular service based on the cellular service brand associated with the brand configuration data stored and/or installed on the mobile device 12 and/or after executing a mobile device reset on the mobile device 12. The limited cellular service may comprise access to one or more specific applications stored on one or more servers in communication with the network 16. For example, brand configuration data associated with a particular cellular service brand may be stored and/or installed on a mobile device 12 branding the mobile device 12 with the particular cellular service brand. A baseball score updating application may have an agreement with the particular cellular service brand so that the baseball score updating application agrees to pay for and/or provide data transmission to mobile device(s) 12 branded with the particular brand even when a mobile device 12 does not receive cellular service. Thus, at least one data package, for example, from the baseball score updating application providing baseball score updates may be transmitted from the baseball score updating application to the mobile device 12 because the brand configuration data is stored and/or installed on the mobile device 12 even when the mobile device 12 is not activated to receive cellular service. In an embodiment, the mobile device 12 may be permitted to transmit at least one data package, for example, to the baseball score updating application when a mobile device owner wishes to specify which baseball teams the mobile device owner wants update for, even though cellular service is not activated on the mobile device 12.

In an embodiment, the mobile device 12 may store a branding application 27 in the memory 24 of the mobile device 12, wherein the branding application 27 is configured to brand the mobile device 12 with a particular cellular service brand, for example, a particular cellular service brand associated with the branding application 27. In an embodiment, the service brand application(s) 46a and/or 46b may be configured to provide the branding application 27 such that the branding application 27 may be downloaded and/or installed on the mobile device 12 through wireless and/or wired data communication. In an embodiment, branding application 27 may be installed in the memory 24 of the mobile device 12 during the manufacture of the mobile device 12 so that the branding application is not deleted during a mobile device reset.

The branding application 27 may be configured to delete an initial set of brand configuration data branding the mobile device 12 with an initial cellular service brand of a cellular service provider (e.g. an initial cellular service provider). For example, the mobile device 12 may be branded with an initial brand associated with an initial set of brand configuration data. A mobile device owner may wish to switch the brand of the mobile device 12 from the initial brand to a different brand. The mobile device owner may download and/or install the branding application 27 associated with the different cellular service brand. The branding application 27 may comprise a different set of brand configuration data associated with the different brand. The branding application 27 may delete the initial set of brand configuration data and replace the initial set of brand configuration data with the different brand configuration data. The mobile device 12 may then execute a mobile device reset allowing the rebranding of the mobile device 12 with the different brand. Similar to previous embodiments, the different brand configuration data may not comprise at least one network access identification code and/or the mobile device number so that cellular service is not activated on the mobile device after installing the different brand configuration data and/or executing a mobile device reset.

In an embodiment, the brand application 27 may be configured to rebrand a mobile device 12 with a plurality of different brands associated with a particular cellular service provider. For example, a cellular service provider may have a pre-paid cellular service brand, a post-pay cellular service brand, and a premium cellular service brand. The branding application 27 may provide a mobile device 12 with a plurality of set of brand configuration data associated with each of the plurality of different brands so that a mobile device owner may rebrand the mobile device owner's mobile device 12 multiple times with different brands.

In an embodiment, the branding application 27 may comprise an activation application 26. For example, after installing the different brand configuration data and/or executing a mobile device reset, a mobile device owner may wish to install and/or download user data and store the user data on the memory 24 of the mobile device 12. The mobile device owner may subsequently wish to receive cellular service on the mobile device 12. The activation application 26 may then request and receive the at least one network access identification code and/or the mobile device number from the service brand application(s) 46a and/or 46b and receive cellular service without deleting the stored user data. Similar to previous embodiments, cellular service may be deactivated and/or reactivated using the activation application 26.

Figure 2:
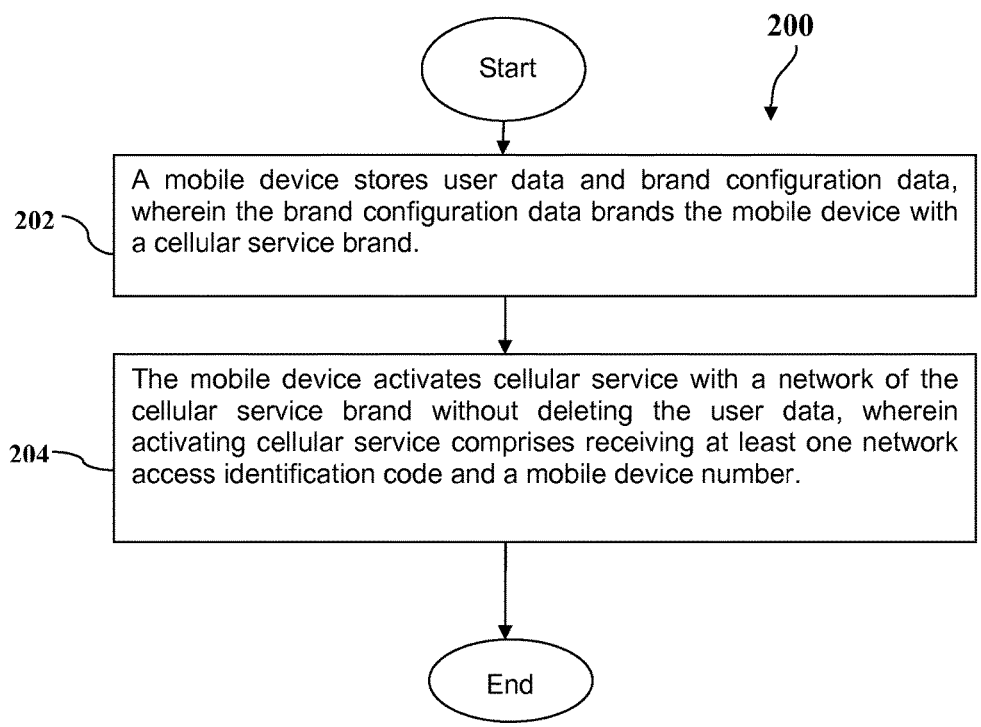
FIG. 2 is a flow chart of a method according to an embodiment of the disclosure.

In FIG. 2, a method 200 is described. At block 202, a mobile device 12 may store user data and brand configuration data, wherein the brand configuration data brands the mobile device 12 with a cellular service brand. In an embodiment, the brand configuration data may not comprise a network access identification code and/or a mobile device number. At block 204, the mobile device 12 may activate cellular service with a network of the cellular service brand without deleting the stored user data, wherein activating cellular service comprises receiving at least one network access identification code and a mobile device number.

In an embodiment, the method 200 may further comprise that the mobile device 12 transmits an identification signal comprising a unique mobile device identifier and receives the brand configuration data in response to transmitting the identification signal, wherein the brand configuration data received by the mobile device 12 is based on the unique mobile device identifier. In an embodiment, the mobile device 12 may transmit the identification signal in response to a first powering on of the mobile device 12, for example the first time the mobile device 12 is powered on after purchase from a retail store or after delivery from an on-line store.

In an embodiment, the method 200 may further comprise that the mobile device 12 deactivates cellular service, wherein deactivating cellular service comprises deleting the at least one network access identification codes and the mobile device number. In an embodiment, the method 200 may further comprise that the mobile device 12 reactivates cellular service with the network without deleting the stored user data and without reinstalling brand configuration data, wherein activating cellular service comprises receiving at least one different network access identification code and a different mobile device number.

In an embodiment, the method 200 may further comprise that the mobile device 12 stores different user data after deactivating the cellular service and before reactivating the cellular service and reactivates cellular service with the network without deleting the stored user data and the stored different user data and without reinstalling the brand configuration data. In an embodiment, the method 200 may further comprise that the mobile device 12 receives at least one data package transmitted through a limited wireless network of the cellular service brand when the cellular service is not activated with the mobile device 12.

Figure 3:
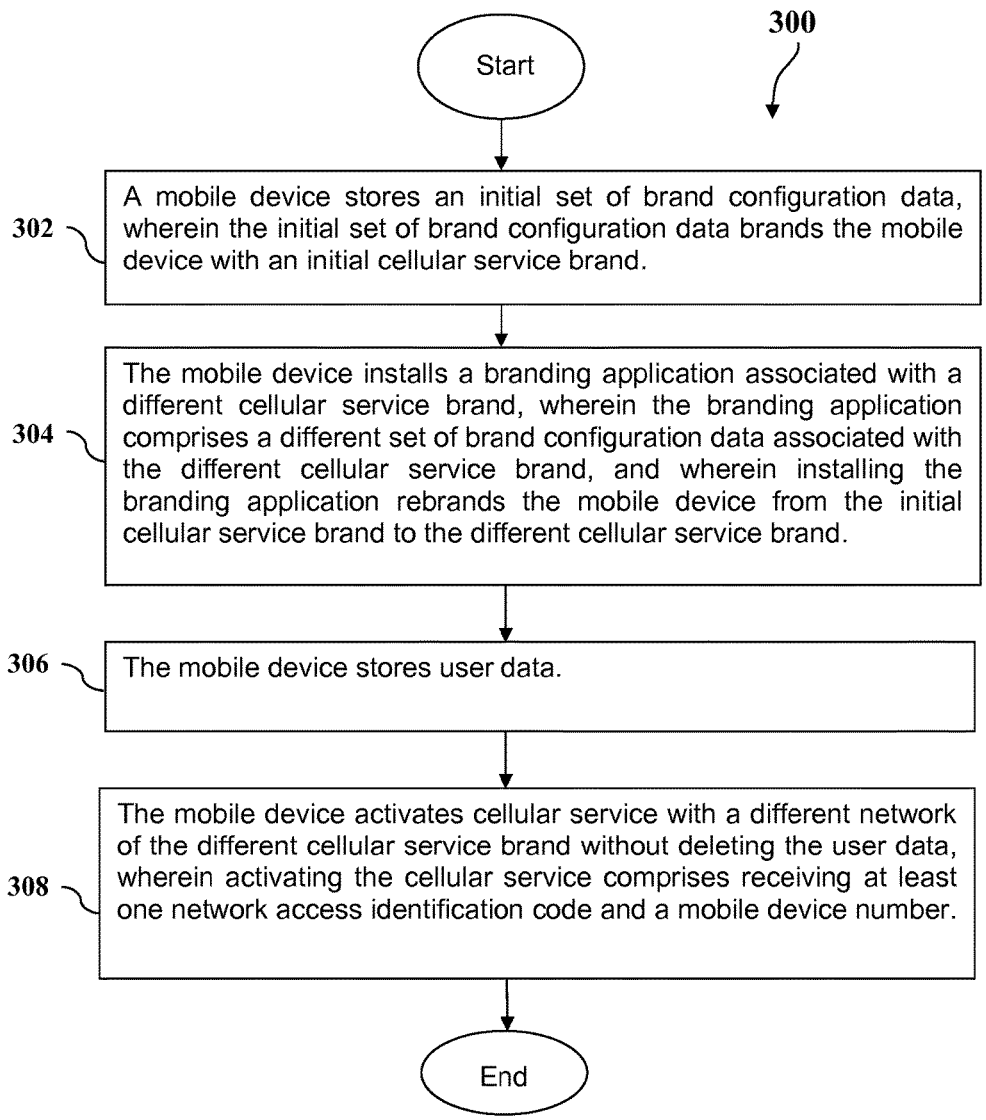
FIG. 3 is a flow chart of a method according to an embodiment of the disclosure.

In FIG. 3, a method 300 is described. At block 302, a mobile device 12 stores an initial set of brand configuration data, wherein the initial set of brand configuration data brands the mobile device 12 with an initial cellular service brand. At block 304, the mobile device 12 installs a branding application 27 associated with a different cellular service brand, wherein the branding application 27 comprises a different set of brand configuration data associated with the different cellular service brand, and wherein installing the branding application 27 rebrands the mobile device 12 from the initial cellular service brand to the different cellular service brand. At block 306, the mobile device 12 stores user data. At block 308, the mobile device 12 activates cellular service with a different network of the different cellular service brand without deleting the stored user data, wherein activating the cellular service comprises receiving at least one network access identification code and a mobile device number.

In an embodiment, the method 300 may further comprise that the mobile device 12 deactivates cellular service with the different network, wherein deactivating cellular service comprises deleting the at least one network access identification code and the mobile device number. In an embodiment, the method 300 may further comprise that the mobile device 12 reactivates cellular service with the different network without deleting the stored user data and without reinstalling the different set of brand configuration data, wherein activating cellular service comprises receiving at least one different network access identification code and a different mobile device number.

In an embodiment, the method 300 may further comprise that the mobile device 12 stores different user data after deactivating the cellular service and before reactivating the cellular service and reactivates cellular service with the different network without deleting the stored user data and the stored different user data and without reinstalling the different set of brand configuration data. In an embodiment, the method 300 may further comprise that the mobile device 12 receives at least one data package transmitted through a limited wireless network of the different cellular service brand after installing the branding application but before the cellular service with the different network is activated with the mobile device 12.

Figure 4:
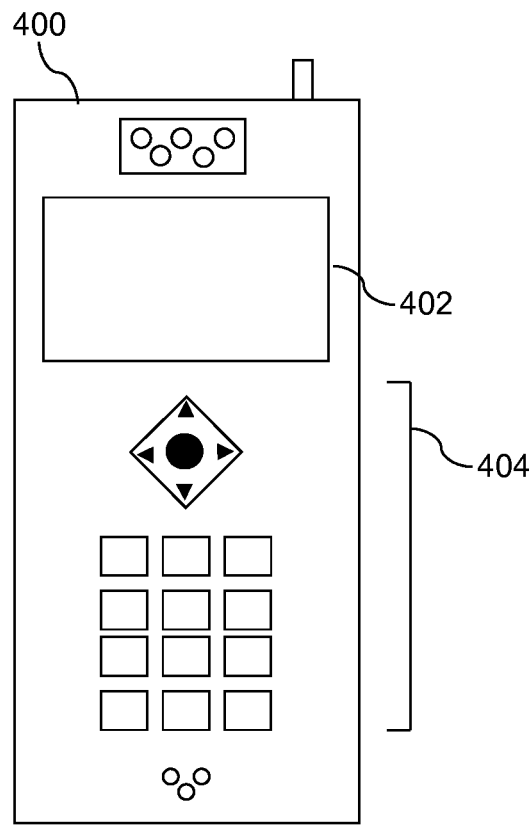
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
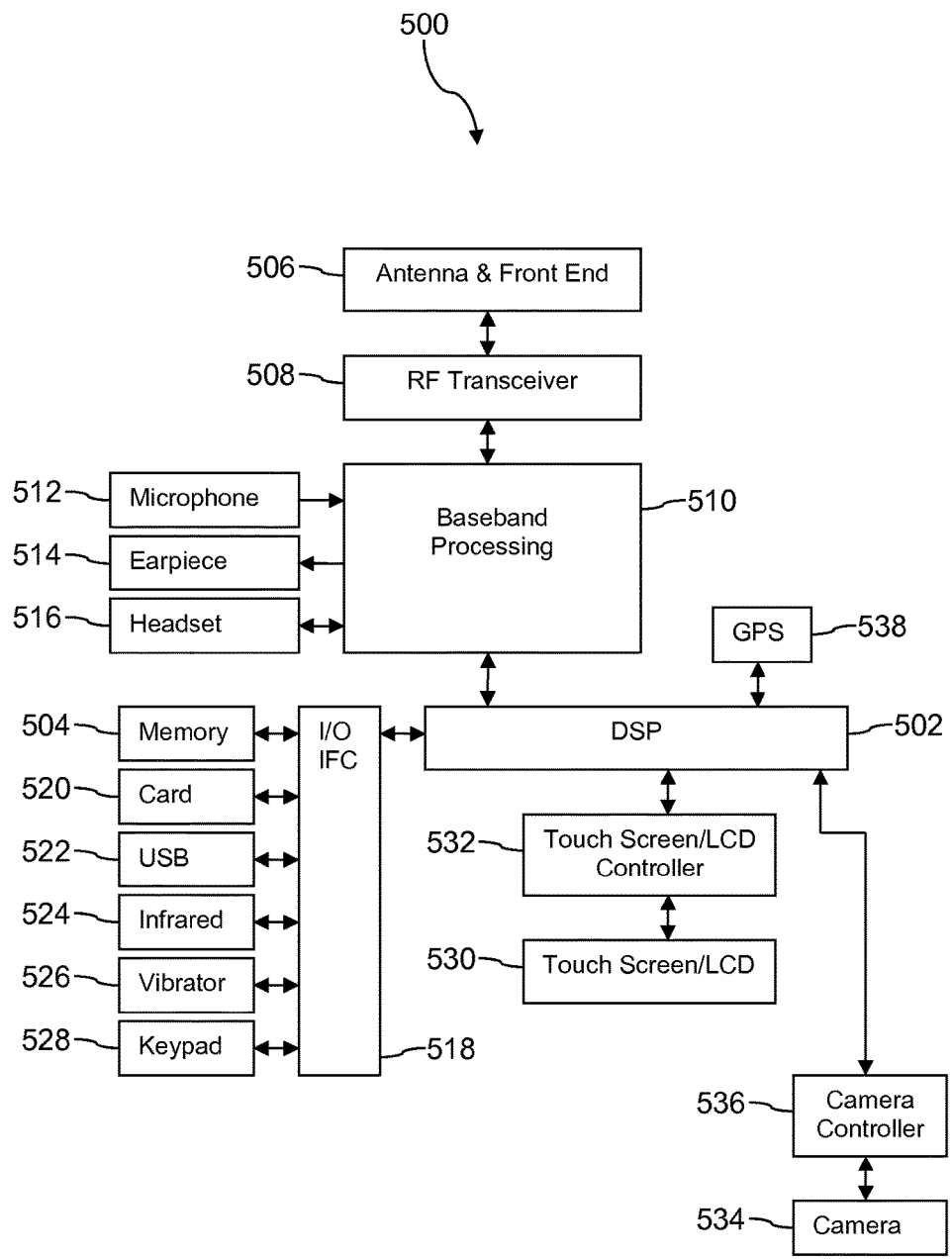
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
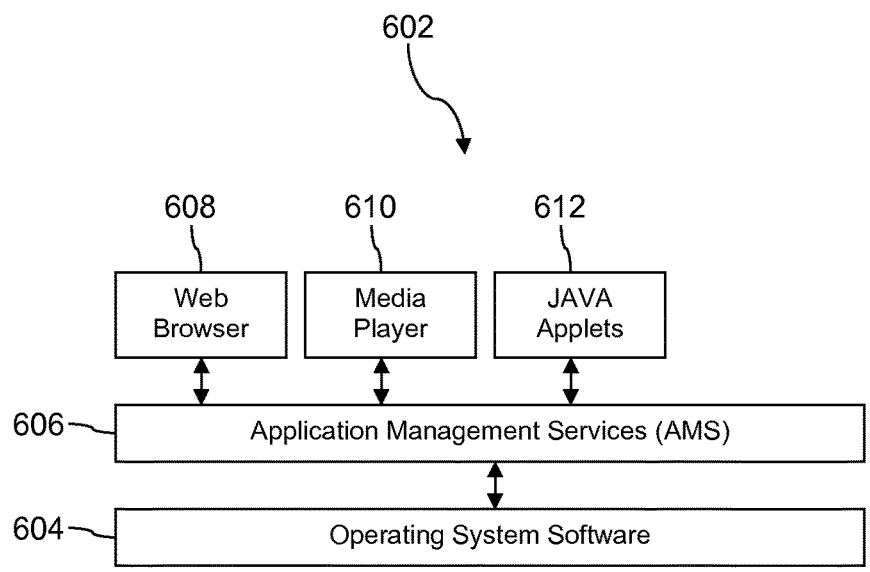
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
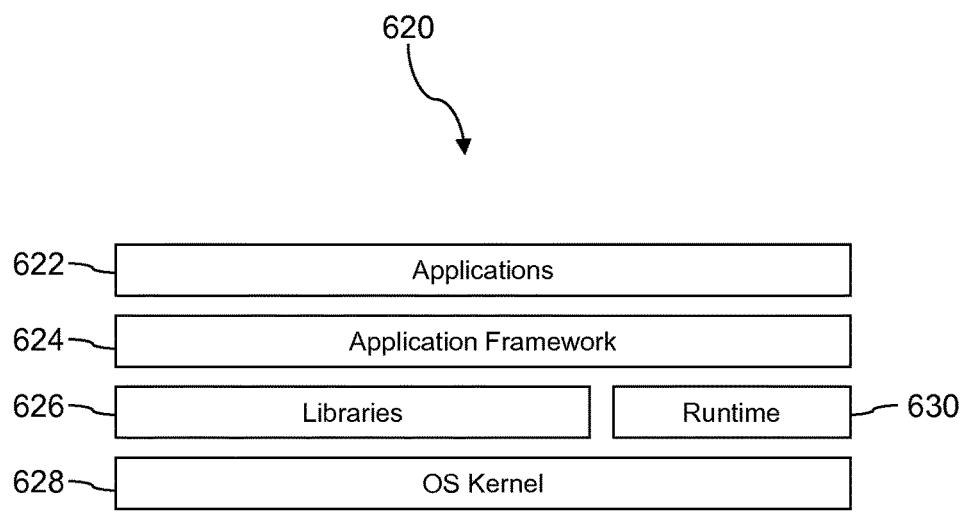

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
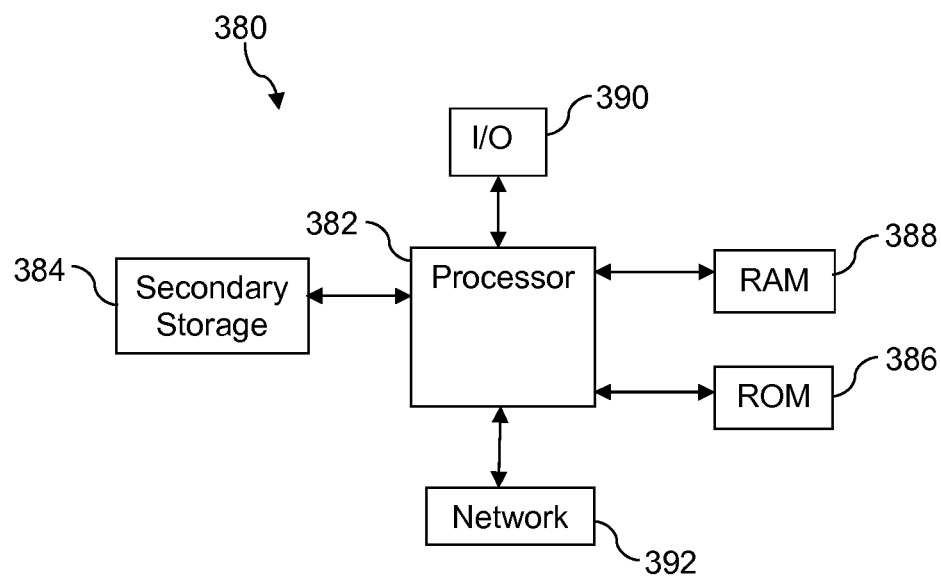
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device branded with a cellular service brand, the mobile device comprising:
    a processor;
    a memory comprising user data and brand configuration data, wherein the brand configuration data brands the mobile device with the cellular service brand prior to and independent of activation of cellular service; and an activation application stored in the memory, that, when executed by the processor, subsequent to branding the mobile device, activates cellular service on the mobile device with a network of the cellular service brand while preserving the user data, wherein activating cellular service subsequent to branding the mobile device preserves the user data via a modem reset instead of a system reset, and wherein activating cellular service comprises receiving at least one network access identification code and a mobile device number.

2. The mobile device of claim 1, wherein after the brand configuration data is installed on the mobile device, a mobile device reset is executed branding the mobile device with the brand associated with the brand configuration data.

3. The mobile device of claim 1, wherein the brand configuration data does not comprise a network access identification code and a mobile device number.

4. The mobile device of claim 1, wherein the brand configuration data is received by the mobile device and installed in the memory of the mobile device in response to transmitting an identification signal from the mobile device.

5. The mobile device of claim 4, wherein the identification signal comprises a unique mobile device identifier, wherein the brand configuration data is based on the unique mobile device identifier.

6. The mobile device of claim 4, wherein the mobile devices transmits the identification signal in response to a first powering on the mobile device.

7. The mobile device of claim 4, wherein the brand configuration data is received by the mobile device through wireless communication comprising at least one of long-term evolution wireless communication, evolution-data optimized wireless communication, single carrier radio transmission technology, or a wireless local area network in a priority order.

8. The mobile device of claim 1, wherein the activation application receives at least one data package transmitted through a limited wireless network of the cellular service brand when the cellular service is not activated with the mobile device.

9. A method of activating cellular service on a mobile device, the method comprising:

storing, by the mobile device, user data and brand configuration data, wherein the brand configuration data brands the mobile device with a cellular service brand prior to and independent of activation of cellular service;

subsequent to branding the mobile device, activating, by the mobile device, cellular service with a network of the cellular service brand while preserving the stored user data, wherein activating cellular service comprises receiving at least one network access identification code and a mobile device number;

deactivating, by the mobile device, the cellular service, wherein deactivating cellular service comprises deleting the at least one network access identification codes and the mobile device number; and reactivating, by the mobile device, the cellular service with the network without deleting the stored user data and without reinstalling the brand configuration data, wherein reactivating cellular service comprises receiving at least one different network access identification code and a different mobile device number.

10. The method of claim 9, wherein the brand configuration data does not comprise the network access identification code and the mobile device number.

11. The method of claim 9, further comprising:
transmitting, by the mobile device, an identification signal comprising a unique mobile device identifier; and
receiving, by the mobile device, the brand configuration data in response to transmitting the identification signal, wherein the brand configuration data received by the mobile device is based on the unique mobile device identifier.

12. The method of claim 11, wherein the mobile device transmits the identification signal in response to a first powering on the mobile device.

13. The method of claim 9, further comprising:
storing, by the mobile device, different user data after deactivating the cellular service and before reactivating the cellular service,
wherein the cellular service is reactivated with the network without deleting the stored different user data.

14. The method of claim 9, further comprising:
receiving, by the mobile device, at least one data package transmitted through a limited wireless network of the cellular service brand when the cellular service is not activated with the mobile device.

15. A method of activating cellular service on a mobile device, the method comprising:

storing, by the mobile device, an initial set of brand configuration data, wherein the initial set of brand configuration data brands the mobile device with an initial cellular service brand;

installing, by the mobile device, a branding application associated with a different cellular service brand, wherein the branding application comprises a different set of brand configuration data associated with the different cellular service brand, and wherein installing the branding application rebrands the mobile device from the initial cellular service brand to the different cellular service brand prior to and independent of activation of cellular service associated with the different cellular service brand;

storing, by the mobile device, user data;

subsequent to rebranding the mobile device, activating, by the mobile device, cellular service with a different network of the different cellular service brand while preserving the stored user data, wherein activating the cellular service comprises receiving at least one network access identification code and a mobile device number;

deactivating, by the mobile device, the cellular service with the different network, wherein deactivating cellular service comprises deleting the at least one network access identification code and the mobile device number;

storing, by the mobile device, different user data after deactivating the cellular service and before reactivating the cellular service; and reactivating, by the mobile device, the cellular service with the different network without deleting the stored user data and the stored different user data and without reinstalling the different set of brand configuration data.

16. The method of claim 15,
wherein reactivating cellular service comprises receiving at least one different network access identification code and a different mobile device number.

17. The method of claim 15, further comprising:
receiving, by the mobile device, at least one data package transmitted through a limited wireless network of the different cellular service brand after installing the branding application but before the cellular service with the different network is activated with the mobile device.

* * * * *